United States Patent [19]
Vukovic

[11] Patent Number: 5,421,780
[45] Date of Patent: Jun. 6, 1995

[54] JOINT ASSEMBLY PERMITTING LIMITED TRANSVERSE COMPONENT DISPLACEMENT

[76] Inventor: Ivan Vukovic, 11004-10 Ave., Edmonton T6J 6N4, Canada

[21] Appl. No.: 81,422

[22] Filed: Jun. 22, 1993

[51] Int. Cl.⁶ .............................................. F16D 3/04
[52] U.S. Cl. ..................................... 464/102; 464/147
[58] Field of Search ................ 464/102, 104, 106, 119, 464/147

[56] References Cited

U.S. PATENT DOCUMENTS

| | | | |
|---|---|---|---|
| 2,011,147 | 8/1935 | Haselau | 464/104 |
| 2,196,297 | 4/1940 | Gagne | 464/119 |
| 2,304,766 | 12/1942 | Pratt | 464/119 |
| 2,334,039 | 11/1943 | Rueb | 464/119 |
| 3,627,453 | 12/1971 | Clark | . |
| 4,440,123 | 4/1984 | Tsai | 464/102 |
| 4,941,861 | 7/1990 | Painter | 464/102 |
| 5,022,645 | 6/1991 | Green | 464/102 |
| 5,048,622 | 9/1991 | Ide | . |
| 5,078,650 | 1/1992 | Foote | 464/104 |
| 5,180,336 | 1/1993 | Güttinger | 464/102 |
| 5,267,903 | 12/1993 | Kuribayashi | 464/147 X |

FOREIGN PATENT DOCUMENTS

| | | | |
|---|---|---|---|
| 924181 | 4/1973 | Canada | . |
| 1222674 | 6/1960 | France | 464/119 |

Primary Examiner—Daniel P. Stodola
Assistant Examiner—Eileen A. Dunn

[57] ABSTRACT

A joint assembly for use in a drive train permits limited transverse component displacement along at least two axes in response to non-coaxial forces in the drive train. The joint assembly includes a first subunit and a second subunit, each subunit having a transverse C-shaped opening in a first end each thereof. A connecting body has a first transverse cylindrical member extending from a first end thereof and a second transverse cylindrical member extending from an opposite second end of the connecting body. The first transverse cylindrical member is received into the transverse C-shaped opening in the first subunit to permit limited displacement along a first axis parallel to such opening. The second transverse cylindrical member is received into the transverse C-shaped opening in the second subunit to permit limited displacement along a second axis parallel to such opening.

10 Claims, 2 Drawing Sheets

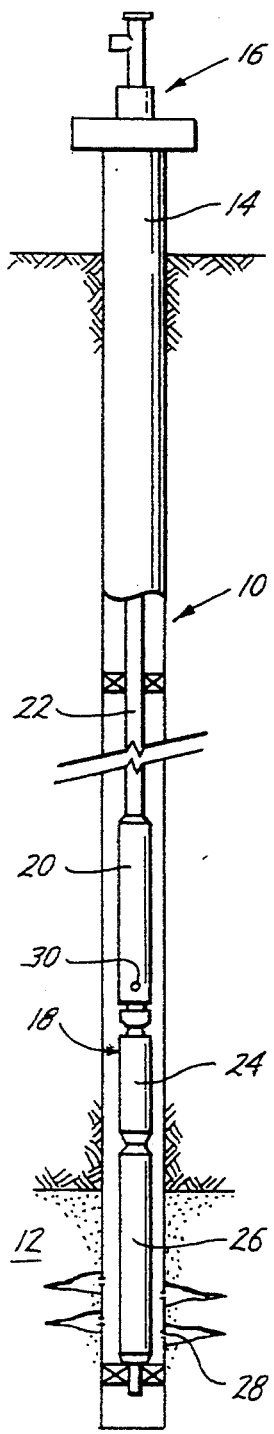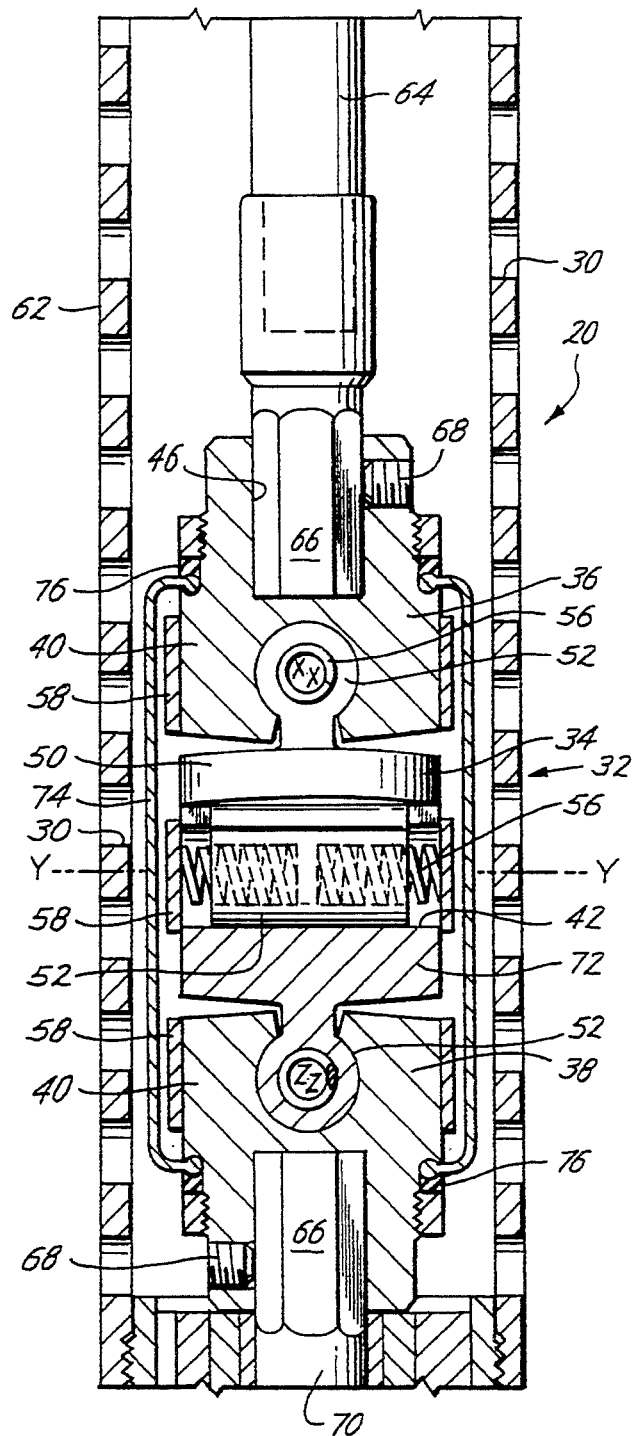

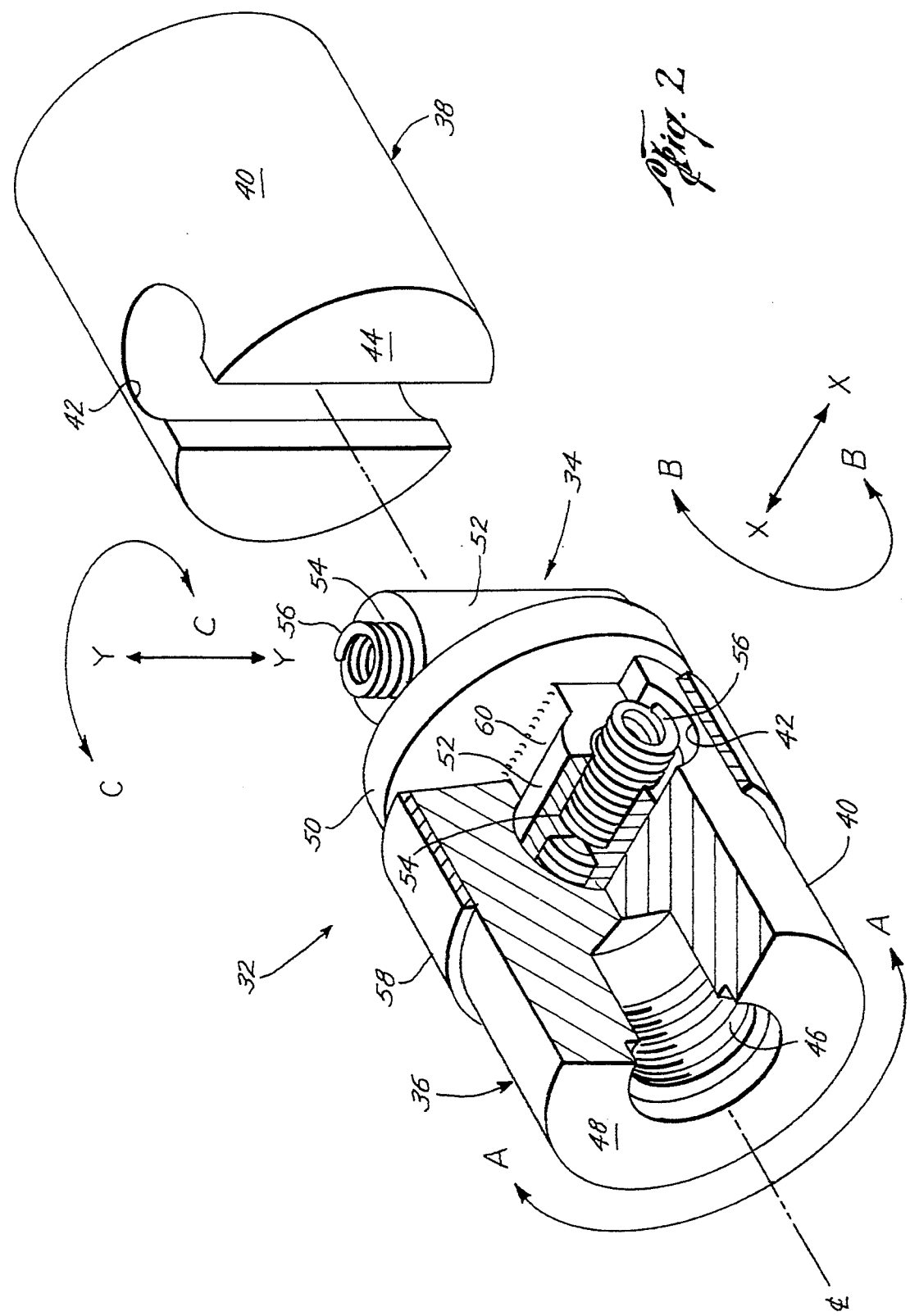

1

JOINT ASSEMBLY PERMITTING LIMITED TRANSVERSE COMPONENT DISPLACEMENT

BACKGROUND OF THE INVENTION

1. Field of the Invention

The present invention relates to a joint assemblies for use in drive trains and, more particularly, to drive trains within downhole rotational tools.

2. Description of Related Art

Subterranean fluids, such as oil, gas and water, are often pumped or "lifted" from wellbores by the operation of downhole pumps, such as by electric submergible pumping systems (ESP's). ESP's typically use an elongated electric motor installed within the wellbore to rotate a multistaged centrifugal pump. While centrifugal pumps are widely used for the recovery of subterranean fluids, such centrifugal pumps have difficulty in lifting viscous fluids, such as from Southern Calif., and fluids with relatively high concentrations of sand and other abrasive materials, such as from the tar sands area of Alberta, Canada. Thus, there is a need for a downhole pump that can lift such fluids.

Canadian Patent 924,181 discloses a solution to the problem using an ESP to recover viscous fluids and fluids with relatively high concentrations of sand with an ESP, and the solution consists of connecting a Moineau pump or a progressive cavity pump (PCP) though a gear reduction system to an ESP's electric motor. Progressive cavity pumps have been proven efficient in recovering relatively viscous fluids and fluids with relatively high concentrations of sand. Examples of progressive cavity pumps are disclosed in U.S. Pat. No. 3,627,453; 4,080,115; and 5,048,622. One major hindrance to the successful operation of such a pumping system has been that the progressive cavity pump inherently causes oscillations and gyrations that propagate through the pumping system's drive train. These oscillations and gyrations are hereinafter referred to as "non-coaxial" forces, and have been found to be of sufficient magnitude to damage the bearings in the ESP's electric motor and thus cause the ESP to prematurely fail. The failed ESP must then be removed from the wellbore, which causes the operator to suffer loss of production, loss of revenue and additional repair costs.

The non-coaxial forces are caused by the rotor in the progressive cavity pump being in the shape of a helix contained within a cavity or a flexible lining within a housing, referred to as the stator. The rotor rolls with respect to the stator so that the rotor and stator form a series of sealed cavities which are approximately 180 degrees apart. As one cavity increases in volume, its counterpart cavity decreases in volume, at exactly the same rate. The driving motion of the rotor is quite complex in that it is simultaneously rotating and moving transversely with respect to the stationary stator's liner. The rotation of the true center of the rotor traces a circle progressing the opposite direction to the rotation of the rotor, but with the same speed. Thus, the rotor driving motion is simultaneously a rotation, an oscillation, and a reverse orbit. It is a combination of these motions acting at the point of interconnection of the rotor to the electric motor that cause the undesired non-coaxial forces to be destructively transmitted to the bearings in the ESP's electric motor.

U.S. Pat. No. 5,408,622 discloses a dual universal joint mechanism for interconnecting a progressive cavity motor with a drill bit. The dual universal joint mechanism disclosed in U.S. Pat. No. '622 tries to solve the same problem of non-coaxial forces as above described by permitting limited non-parallel axial deflection or "buckling" of the drive train in response to such forces about two conventional dual-yoked universal joints. However, it has been found that this "buckling" causes the overall length of the assembly to be reduced thereby requiring an additional slip joint connector. Further, once the universal joint has been deflected or "buckled out of parallel axial alignment", and compression forces are added, there is no way for the universal joint to un-buckle and be realigned so that it can move in response to noncoaxial forces.

There is a need for a joint assembly for use in the drive train of a downhole tool that can efficiently and reliably reduce or eliminate such non-coaxial forces so that a progressive cavity pump can be successfully connected to and used with an ESP's electric motor.

SUMMARY OF THE INVENTION

The present invention has been contemplated to overcome the foregoing deficiencies and meet the above described needs. Specifically, the present invention is a joint assembly for interconnection into a drive train of a downhole rotary tool, such as an ESP. The joint assembly permits limited transverse component displacement along at least two axes to reduce or eliminate non-coaxial forces that heretofore have damaged the bearings in the ESP's electric motor. The joint assembly comprises a first subunit and a second subunit, which each subunit having a transverse opening extending across a first end thereof. A connecting body has a first member extending from a first end thereof and a second member extending from an opposite second end thereof. The first member is received into the transverse opening in the first subunit to permit limited displacement or "sliding" along a first axis parallel to such opening. The second member is received into the transverse opening in the second unit to permit limited displacement along a second axis parallel to such opening.

The joint assembly of the present invention does not permit sufficient rotational movement about the first and second axis to permit the undesired "buckling" of the prior systems with the resultant, and the non-coaxial forces are translated to non-destructive sliding motions that are not propagated to the bearings of the ESP's electric motor.

BRIEF DESCRIPTION OF THE DRAWINGS

FIG. 1 is an elevational view of a progressive cavity pump connected to an ESP's electric motor in accordance with one preferred embodiment of a joint assembly of the present invention, and with such progressive cavity pump and electric motor suspended within a wellbore.

FIG. 2 is a partial cross-sectional, perspective view of one preferred embodiment of a joint assembly of the present invention.

FIG. 3 is a cross-sectional, elevational view of an alternate preferred embodiment of a joint assembly of the present invention, and with such joint assembly interconnected between a progressive cavity pump and an ESP's motor protector.

DETAILED DESCRIPTION OF THE PREFERRED EMBODIMENTS

To aid in the understanding of the present invention, reference is made to the accompanying drawings. FIG. 1 illustrates a well 10 adapted to recover subterranean fluids, such as oil, gas and/or water, from one or more subterranean earthen formations 12. The well 10 includes a tubing or casing string 14 which is connected at the earth's surface to a production tree 16, which includes appropriate valving and piping, as is well known to those skilled in the art. Suspended within the well 10 is an electric submergible pumping system (ESP), generally indicated by reference number 18. The ESP 18, for the purposes of the present discussion, comprises a Moineau pump or a progressive cavity pump 20 connected at an upper portion thereof to a production tubing 22 for the transport of the subterranean fluids to the earth's surface. Connected to a lower end of the pump 20 is an ESP's electric motor protector 24 and connected below the motor protector 24 is an ESP's electric motor 26. As is well known to those skilled in the art, fluids from the subterranean formations 12 enter through openings or perforations 28 in the casing 14, and the fluids are transported upwardly past the exterior of the electric motor 26 and the motor protector 24 to enter one or more openings 30 in a lower portion of the pump 20. Once the fluids enter the opening(s) 30, the fluids are transported upwardly through the pump 20 by the rotation of the helix-shaped rotor (not shown), about the corresponding helix-shaped stationary stator (not shown) and the fluids are then transported upwardly through the piping 22 to the earth's surface.

As has been described above, the joint assembly of the present invention is intended for use as an interconnection between a rotor of the pump 20 and a drive shaft either of the motor protector 24 or of the electric motor 26. It should be understood that the joint assembly of the present invention can also be used to interconnect the rotor of the pump 20 to a planetary gear reduction system (not shown), as disclosed in Canadian Patent 924,181. Further, the joint assembly can be used to interconnect the rotor of a progressive cavity motor to a drill bit, as disclosed in U.S. Pat. No. 5,408,622, or to any other component within a downhole rotary tool as desired. The joint assembly of the present invention can be used in industrial drive train applications such as within air compressors, milling machinery, and the like.

One preferred embodiment of the joint assembly of the present invention is shown in FIG. 2 and is generally indicated by reference number 32. The joint assembly 32 comprises a connecting body 34 located between a first subunit 36 and a second subunit 38. Each subunit 36 and 38 comprises a generally cylindrical body 40 with a transverse slot or opening 42 extending at least partially across the body 40 adjacent a first end 44 thereof. The opening 42 can be of any desired shape, such as rectangular, rounded and, preferably, C-shaped. Each body 40 includes means for drive train interconnection 46, such as a threaded male protrusion, a threaded female opening or a multi-faceted opening in a second end 48 thereof.

The connecting body 34 comprises a central body in the form of a disc 50 to which at least one transverse cylindrical member 52 extends out therefrom on each opposite face or end of the disc 50. The cylindrical members 52 can be separately made and then mechanically connected to the opposite ends of the disc 50, or such cylindrical members 52 can be formed as an integral part of the disc 50, as shown in FIG. 2. Further, the connecting body 34 can comprise only the cylindrical members 52 connected directly each to the other transverse to a central axis (center line), thus without the disc 50.

Each cylindrical member 52 defines a reference transverse axis, either X—X or Y—Y, coaxial with and parallel to the openings 42 in the subunits 36 and 38. The axis X—X and the axis Y—Y are parallel to each other, but are preferably rotated from about 45° to about 120° relative to each other. For the preferred embodiment shown in FIG. 2, the axis X—X and axis Y—Y are approximately perpendicular (ie. rotated about 90°) relative to each other.

The size, shape and configuration of the cylindrical members 52 is chosen so that they will fit within the transverse openings 42 and permit sliding motion along the axes X—X and Y—Y. The cross-sectional configuration of the cylindrical members 52 need not be cylindrical, but can be spherical, square, triangular, T-shaped or of any configuration desired as long as each such member 52 fits within and is, preferably, partially restrained by the configuration and relevant dimension of the corresponding opening 42 in each subunit 36 and 38.

When assembled, the first subunit 36 is interconnected to a lower end of the rotor (not shown) of the pump 20, and the second subunit 38 is interconnected to an upper end of a drive shaft (not shown) extending from either the motor protector 24 or the electric motor 26. The connecting body 34 is rotated so that the cylindrical member 52 adjacent the first end 44 of the first subunit 36 is slid laterally (along axis X—X) to fit within and be partially restrained within the opening 42 therein. The same procedure is used to install the second cylindrical member 42 within the opening 42 of the second subunit 38. When the electric motor 26 rotates the rotor of the pump 20 in Direction A about its longitudinal center line, the non-coaxial forces from the pump 20 tend to push the longitudinal center line of the lower end of the rotor along axis X—X and/or axis Y—Y, and away from the center line of the joint assembly 32 and the electric motor 26. Rather than having the second subunit 38 be "buckled" or angularly displaced, as is the case in conventional universal joints, the second subunit 38 can be displaced or slid laterally out of coaxial alignment but sill within, parallel axial alignment, as the lateral forces are permitted to cause limited sliding or transverse displacement of the components, ie. first subunit 36 displaced along axis X—X and/or axis Y—Y. The non-coaxial forces are thus eliminated or at least minimized by this sliding motion and such forces have been found to not be transferred to the ESP's electric motor 26, thus the bearings of the ESP's electric motor 26 should not be subjected such destructive forces.

To assist in preventing the connecting body 34 from rapidly sliding back and forth along the axis X—X and/or the axis Y—Y, i.e. akin to a chattering motion or vibration, and to prevent the components from remaining longitudinally displaced when the drive train is under compression or tension, a restorative biasing mechanism is provided for biasing the subunits 36 and 38 to coaxial alignment. This biasing mechanism includes at least one longitudinal, and preferably, coaxial bore 54 that extends at least partially into each cylindrical member 52. As shown in FIG. 2, if two coaxial or parallel bores 54 are provided, each need not intersect.

A spring 56 is disposed in each bore 54, and the length of each of the cylindrical members 52 is less than the diameter of the body 40 so that an outer end of each spring 56 extends partially out from the bore 54. An outer sleeve 58 is slid or assembled around each of the bodies 40 to at least partially encompass the areas adjacent the outer ends of the openings 42 and to compress and restrain the springs 56. The outer sleeves 58 are secured in place by set screws (not shown) or other suitable devices. In operation, this biasing mechanism causes the connecting body 34 to be forced (by action of the springs 56) back towards the longitudinal center line in the event that non-coaxial forces have caused some lateral movement (ie. sliding) of the subunits 36 and 38.

The joint assembly 32 can be configured to provide limited rotational movement in Direction B about axis X—X and/or in Direction C about axis Y—Y. To permit such limited rotational movement, the width of the opening 42 across the first end 44 needs to be sufficiently greater than the width of a throat portion 60 that connects the cylindrical member 52 to the disc 50. Further, the length of such throat portion 60 needs to be sufficiently great enough to space the disc 50 from the first end 44 to permit the desired limited rotational movement. Additionally, the first end 44 can be curved or beveled starting at the longitudinal center line of the opening 42 to permit the desired rotational movement about axis X—X and/or axis Y—Y.

In certain circumstances where greater transverse component displacement is desired, one or more additional connecting bodies 34 can be added to the joint assembly 32. Accordingly, one preferred alternate embodiment of present invention is show in FIG. 3 wherein the joint assembly 32 is shown operatively mounted within an outer casing 62 of the lower end of the pump 20. A lower end of a rotor 64 of the pump 20 includes threads or a multi faceted interconnection 66 to be received into the interconnection opening 46 of the first subunit 36, and held therein by a set screw or ball detent 68. The second subunit 38 is connected in the same manner to an upper end of a drive shaft 70 extending upwardly from a planetary gear reduction system (not shown), the motor protector 24 or from the ESP's electric motor 26.

The connecting body 34 is connected to the first subunit 36 in the manner described previously, but is connected to the second subunit 38 through an intermediary body 72. The intermediary body 72 comprises a generally cylindrical body with a transverse C-shaped slot or opening 42 in a first end thereof into which is received the second cylindrical member 52 on the second end of the connecting body 34, and includes springs 56 and the outer sleeve 58, all as described previously. A second, opposite end of the intermediary body 72 includes a transverse cylindrical member 52, which is received into the transverse C-shaped opening 42 in the second subunit 38, in the manner as previously described.

In this alternate embodiment, a third axis Z—Z extends out from the longitudinal center line of the opening 42 of the second subunit 38, while the first axis X—X extends out from the longitudinal center line of the opening 42 of the first subunit 36 and the second axis Y—Y extends out from the longitudinal center line of the opening 42 in the intermediary body 72. The degrees of rotation of the three axes with respect to each other need not be uniform nor add up to 180°. For example, axis Y—Y can be about 45° rotated from axis X—X, and axis Z—Z can be about 45° rotated from axis Y—Y. Preferably, axis Y—Y is rotated from about 45° to about 120° relative to axis X—X and axis Z—Z. Most preferably, axis Y—Y is rotated about 60° relative to axis X—X and axis Z—Z is rotated about 60° relative to axis Y—Y.

This alternate preferred embodiment can be provided with the capability of limited rotational movement about axes X—X, Y—Y and/or Z—Z by spacing and rounding of the ends of the components as described previously.

While all embodiments of the joint assembly of the present invention are contemplated to operate in a wellbore environment without the need for seals or debris protection, it is preferred that debris be prevented from entering the joint assembly 32. Therefore, as shown in FIG. 3, an outer cylindrical deformable metal or elastomeric bag 74 extends across the joint assembly 32 and is sealed at each end thereof by bands or brackets 76 that interact with the bodies 40 of each subunit 36 and 38. In this manner, the internal workings of the joint assembly 32 will not become contaminated with wellbore debris, and the bag 74 may be filled with oil or grease to ease transverse movement of the components.

Whereas the present invention has been described in particular relation to the drawings attached hereto, it should be understood that other and further modifications, apart from those shown or suggested herein, may be made within the scope and spirit of the present invention.

What is claimed is:

1. A joint assembly permitting limited transverse component displacement along at least first and second axes, comprising:
   a first subunit and a second subunit, each subunit having a transverse opening in a first end thereof;
   a connecting body having a first member extending from a first end thereof and a second member extending from a opposite second end thereof;
   the first member of the connecting body being adapted to be received into the transverse opening in the first subunit to permit limited displacement along the first axis, which is parallel to the transverse opening in the first subunit, and the second member of the connecting body being adapted to be received into the transverse opening in the second subunit to permit limited displacement along the second axis, which is parallel to the transverse opening in the second subunit; and
   means for biasing the first member of the connecting body to a coaxial longitudinal alignment of the connecting body with the first subunit, the means for biasing is disposed within the respective transverse openings of the first and second subunits such that the first and second members of the connecting body are operatively connected to the first and second subunits.

2. A joint assembly of claim 1 wherein the first member has a circular cross-section and the transverse opening in the first subunit is C-shaped.

3. A joint assembly of claim 1 wherein the first axis is rotated from about 45 degrees to about 120 degrees relative to the second axis.

4. A joint assembly of claim 3 wherein the first axis is approximately perpendicular to the second axis.

5. A joint assembly of claim 1 wherein the biasing means further comprises at least one bore extending into the first member; a spring partially extending out from the at least one bore; and an outer sleeve partially encompassing the at least one bore in the first member and the spring.

6. A joint assembly of claim 1 wherein the first ends of the first subunit and the second subunit, and the first end and the second end of the connecting body are all each shaped and spaced to permit limited rotational movement of the first subunit about the first axis X—X and to permit limited rotational movement of the second subunit about the second axis Y—Y.

7. A joint assembly permitting limited transverse component displacement along at least first, second and third axes, comprising:
 a first subunit and a second subunit, each subunit having a transverse opening in a first end thereof;
 a connecting body having a first member extending from a first end thereof and a second member extending from an opposite second end thereof;
 an intermediary body having a transverse opening in a first end thereof and a first member extending from an opposite end thereof;
 the first member of the connecting body being adapted to be received into the transverse opening in the first subunit to permit limited displacement along the first axis, which is parallel to the transverse opening in the first subunit, and the second member of the connecting body being adapted to be received into the transverse opening in the second subunit to permit limited displacement along the second axis, which is parallel to the transverse opening in the second subunit, and the first member of the intermediary body being adapted to be received into the transverse opening in the second subunit to permit limited displacement along the third axis, which is parallel to the transverse opening in the second subunit; and
 means for biasing the first member of the connecting body to a coaxial longitudinal alignment of the connecting body with the first subunit, the means for biasing is disposed within the respective transverse openings of the first subunit and the intermediary body such that the first and second members of the connecting body are operatively connected to the first subunit and the intermediary body.

8. A joint assembly of claim 7 wherein the first axis X—X is rotated from about 45 degrees to about 120 degrees relative to the second axis, and the second axis is rotated from about 45 degrees to about 120 degrees relative to the third axis.

9. A joint assembly of claim 7 wherein the first ends of the first subunit and the second subunit, the first end and the second end of the connecting body, and the first end and the second end of the intermediary body are all each shaped and spaced to permit limited rotational movement of the first subunit about the axis X—X, to permit limited rotational movement of the connecting body about the axis Y—Y, and to permit limited rotational movement of the second subunit about the axis Z—Z.

10. A joint assembly of claim 7 wherein the biasing means further comprises at least one bore extending into the first member of the connecting body; a spring partially extending out from the at least one bore; and an outer sleeve partially encompassing the at least one bore in the first member of the connecting body and the spring.

* * * * *